US012570876B2

(12) United States Patent　　　(10) Patent No.: US 12,570,876 B2
Chiba et al.　　　　　　　　　　(45) Date of Patent: Mar. 10, 2026

(54) WATER-DISPERSED PRESSURE-SENSITIVE ADHESIVE COMPOSITION AND PRESSURE-SENSITIVE ADHESIVE SHEET FOR RE-PEELING

(71) Applicant: NITTO DENKO CORPORATION, Ibaraki (JP)

(72) Inventors: Mizuho Chiba, Ibaraki (JP); Taiki Kitagawa, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 112 days.

(21) Appl. No.: 18/430,956

(22) Filed: Feb. 2, 2024

(65) Prior Publication Data

US 2024/0263047 A1　　Aug. 8, 2024

(30) Foreign Application Priority Data

Feb. 6, 2023　(JP) ................................. 2023-016160
Oct. 31, 2023　(JP) ................................. 2023-186571

(51) Int. Cl.
　C09J 7/38　　　　(2018.01)
　C09J 133/08　　　(2006.01)
(52) U.S. Cl.
　CPC ............. C09J 7/385 (2018.01); C09J 133/08 (2013.01); C09J 2203/326 (2013.01); C09J 2203/37 (2020.08); C09J 2301/302 (2020.08); C09J 2301/312 (2020.08); C09J 2301/408 (2020.08)

(58) Field of Classification Search
CPC ... C09J 7/385; C09J 133/08; C09J 4/06; C09J 7/30; C09J 2203/37; C09J 2301/312; C09J 2301/408; C09J 2301/302; C08F 265/06
USPC ......................................................... 156/332
See application file for complete search history.

(56) References Cited

U.S. PATENT DOCUMENTS

2016/0264825 A1* 9/2016 Ukei ........................ C09J 7/243

FOREIGN PATENT DOCUMENTS

JP　　　2009073920 A　　4/2009
JP　　　2019031620 A　　2/2019

* cited by examiner

*Primary Examiner* — James D Sells
(74) *Attorney, Agent, or Firm* — Alleman Hall LLP

(57)　　　　　　ABSTRACT

Provided are: a water-dispersed pressure-sensitive adhesive composition that has an excellent pressure-sensitive adhesive strength, and that can achieve both of adhesiveness to an adherend and peelability; and a pressure-sensitive adhesive sheet for re-peeling using the water-dispersed pressure-sensitive adhesive composition. The water-dispersed pressure-sensitive adhesive composition includes: a water-dispersed acrylic polymer; an active energy ray-curable resin; and a photopolymerization initiator, wherein the water-dispersed acrylic polymer is a polymer having two or more glass transition temperatures.

8 Claims, 1 Drawing Sheet

100
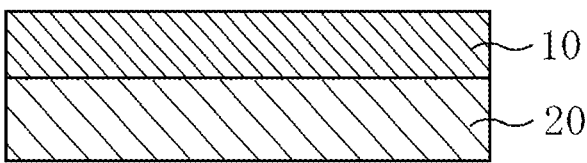
— 10
— 20

WATER-DISPERSED PRESSURE-SENSITIVE ADHESIVE COMPOSITION AND PRESSURE-SENSITIVE ADHESIVE SHEET FOR RE-PEELING

This application claims priority under 35 U.S.C. Section 119 to Japanese Patent Application No. 2023-016160 filed on Feb. 6, 2023, and Japanese Patent Application No. 2023-186571 filed on Oct. 31, 2023 which are herein incorporated by reference.

BACKGROUND OF THE INVENTION

1. Field of the Invention

The present invention relates to a water-dispersed pressure-sensitive adhesive composition and a pressure-sensitive adhesive sheet for re-peeling including a pressure-sensitive adhesive layer formed by using the water-dispersed pressure-sensitive adhesive composition.

2. Description of the Related Art

A pressure-sensitive adhesive sheet has been widely used for the purposes of surface protection and fixation of an adherend. For example, in a processing process for a semiconductor wafer, the pressure-sensitive adhesive sheet is used for appropriately holding the semiconductor wafer serving as the adherend in each of a backgrinding step and a dicing step. In recent years, miniaturization and thinning of a chip have been advanced, and such a pressure-sensitive adhesive strength that the semiconductor wafer can be appropriately held even when the semiconductor wafer is thinly ground at the time of processing is required. However, a pressure-sensitive adhesive sheet having a high pressure-sensitive adhesive strength may break the wafer at the time of its peeling. Accordingly, a light-peelable pressure-sensitive adhesive sheet that can be easily peeled from the adherend after the processing has been required. As such pressure-sensitive adhesive sheet, a pressure-sensitive adhesive sheet using a UV-curable pressure-sensitive adhesive has been proposed. The pressure-sensitive adhesive sheet to be used in the processing process for the semiconductor wafer is peeled from the semiconductor wafer after its use, and hence a pressure-sensitive adhesive sheet having re-peelability has been preferably used. A solvent-based pressure-sensitive adhesive has been widely used as a pressure-sensitive adhesive having re-peelability (for example, Japanese Patent Application Laid-open No. 2019-31620). In recent years, a reduction in environmental load has been required, and hence an attempt has been made to use an aqueous pressure-sensitive adhesive (for example, Japanese Patent Application Laid-open No. 2009-73920). When the aqueous pressure-sensitive adhesive is used, it is difficult to achieve both of a sufficient pressure-sensitive adhesive strength before UV irradiation and light peelability after UV irradiation even in the case where the UV-curable pressure-sensitive adhesive is adopted.

SUMMARY OF THE INVENTION

The present invention has been made to solve the above-mentioned problems of the related art, and an object of the present invention is to provide a water-dispersed pressure-sensitive adhesive composition that has an excellent pressure-sensitive adhesive strength, and that can achieve both of adhesiveness to an adherend and light peelability, and a pressure-sensitive adhesive sheet for re-peeling using the water-dispersed pressure-sensitive adhesive composition.

1. According to at least one embodiment of the present invention, there is provided a water-dispersed pressure-sensitive adhesive composition including: a water-dispersed acrylic polymer; an active energy ray-curable resin; and a photopolymerization initiator, wherein the water-dispersed acrylic polymer is a polymer having two or more glass transition temperatures.

2. In the water-dispersed pressure-sensitive adhesive composition according to the above-mentioned item 1, the water-dispersed acrylic polymer may have a glass transition temperature $Tg_H$ that is 0° C. or more and a glass transition temperature $Tg_L$ that is less than 0° C.

3. In the water-dispersed pressure-sensitive adhesive composition according to the above-mentioned item 1 or 2, the water-dispersed acrylic polymer may be a polymer having a core-shell type structure.

4. The water-dispersed pressure-sensitive adhesive composition according to any one of the above-mentioned items 1 to 3 may further include a cross-linking agent.

5. According to at least one embodiment of the present invention, there is provided a water-dispersed pressure-sensitive adhesive composition including: a water-dispersed acrylic polymer; an active energy ray-curable resin; and a photopolymerization initiator, wherein the water-dispersed acrylic polymer is a polymer having a core-shell type structure.

6. According to at least one embodiment of the present invention, there is provided a pressure-sensitive adhesive sheet for re-peeling. The pressure-sensitive adhesive sheet for re-peeling may include: a pressure-sensitive adhesive layer; and a base material, wherein the pressure-sensitive adhesive layer is a layer formed by using the water-dispersed pressure-sensitive adhesive composition of any one of the above-mentioned items 1 to 5.

7. The pressure-sensitive adhesive sheet for re-peeling according to the above-mentioned item 6 may have a 1800 pressure-sensitive adhesive strength to a Si wafer after UV irradiation at an integrated light quantity of 460 mJ/cm$^2$ of less than 0.1 N/20 mm.

8. The pressure-sensitive adhesive sheet for re-peeling according to the above-mentioned item 6 or 7 may have a 180° pressure-sensitive adhesive strength to a Si wafer of 4 N/20 mm or more.

9. The pressure-sensitive adhesive sheet for re-peeling according to any one of the above-mentioned items 6 to 8 may be used for semiconductor wafer processing.

BRIEF DESCRIPTION OF THE DRAWINGS

The FIGURE is a schematic sectional view of a pressure-sensitive adhesive sheet for re-peeling according to at least one embodiment of the present invention.

DESCRIPTION OF THE EMBODIMENTS

A. Water-Dispersed Pressure-Sensitive Adhesive Composition

A water-dispersed pressure-sensitive adhesive composition according to at least one embodiment of the present invention includes: a water-dispersed acrylic polymer; an active energy ray-curable resin; and a photopolymerization initiator. The water-dispersed acrylic polymer is a polymer having two or more glass transition temperatures (hereinafter also referred to as "Tg"). That is, the water-dispersed pressure-sensitive adhesive composition according to at least one embodiment of the present invention includes an emulsion of an acrylic polymer having two or more glass transition temperatures. When such emulsion is used, there can be provided a water-dispersed pressure-sensitive adhesive composition that has an excellent pressure-sensitive adhesive strength, and that can achieve both of adhesiveness to an adherend and light peelability. The water-dispersed pressure-sensitive adhesive composition according to at least one embodiment of the present invention has an excellent pressure-sensitive adhesive strength, and can achieve both of adhesiveness to an adherend and light peelability, even though the water-dispersed pressure-sensitive adhesive composition is an aqueous pressure-sensitive adhesive composition. Accordingly, there can be provided a pressure-sensitive adhesive composition that is reduced in environmental load through a reduction in usage amount of a solvent, and that may be suitably used in a processing process for a semiconductor wafer as well.

A-1. Water-Dispersed Acrylic Polymer

The water-dispersed acrylic polymer (hereinafter also referred to as "acrylic polymer") may be obtained by subjecting any appropriate monomer component to emulsion polymerization in water. That is, the water-dispersed acrylic polymer is an emulsion of an acrylic polymer. The average particle diameter of the acrylic polymer emulsion is preferably from 80 nm to 400 nm, more preferably from 100 nm to 300 nm, still more preferably from 100 nm to 200 nm. Herein, the term "average particle diameter of the water-dispersed acrylic polymer" refers to a volume-based median diameter (D50) measured by a laser diffraction-scattering method.

The water-dispersed acrylic polymer preferably has a glass transition temperature $Tg_H$ that is 0° C. or more and a glass transition temperature $Tg_L$ that is less than 0° C. When the water-dispersed acrylic polymer has a $Tg_H$ and a $Tg_L$, there can be provided a water-dispersed pressure-sensitive adhesive composition that has an excellent pressure-sensitive adhesive strength, and that can achieve both of adhesiveness to an adherend and light peelability. When the water-dispersed acrylic polymer has three or more glass transition temperatures, the water-dispersed acrylic polymer may be a water-dispersed acrylic polymer having two or more $Tg_H$s and one $Tg_L$, a water-dispersed acrylic polymer having one $Tg_H$ and two or more $Tg_L$s, or a water-dispersed acrylic polymer having two or more $Tg_H$s and two or more $Tg_L$s.

The $Tg_H$ is 0° C. or more, preferably 5° C. or more, more preferably 10° C. or more, still more preferably 15° C. or more. When the $Tg_H$ falls within the above-mentioned ranges, there can be provided a water-dispersed pressure-sensitive adhesive composition that has an excellent pressure-sensitive adhesive strength, and that can achieve both of adhesiveness to an adherend and light peelability. When the $Tg_H$ is less than 0° C., the modulus of elasticity throughout a bulk is reduced, and hence the pressure-sensitive adhesive strength after UV irradiation may not be sufficiently reduced. The $Tg_H$ is, for example, 80° C. or less. In addition, the $Tg_L$ is less than 0° C., preferably −5° C. or less, more preferably −10° C. or less, still more preferably −15° C. or less, particularly preferably −20° C. or less. When the $Tg_L$ falls within the above-mentioned ranges, there can be provided a water-dispersed pressure-sensitive adhesive composition that has an excellent pressure-sensitive adhesive strength, and that can achieve both of adhesiveness to an adherend and light peelability. The $Tg_L$ is, for example, −50° C. or more. When the $Tg_L$ is 0° C. or more, adhesiveness between a pressure-sensitive adhesive layer formed by using the pressure-sensitive adhesive composition and an adherend is low, and hence a sufficient pressure-sensitive adhesive strength may not be obtained before UV irradiation.

Herein, the term "glass transition temperature of the water-dispersed acrylic polymer" refers to a theoretical value calculated by Fox's equation from monomer units for forming each polymer and ratios thereof. The theoretical glass transition temperature determined by Fox's equation may be consistent with an actually measured glass transition temperature determined by a method, such as differential scanning calorimetry (DSC) or dynamic viscoelasticity measurement. As described later, when the theoretical value cannot be calculated, the actually measured glass transition temperature may be used.

As described below, Fox's equation is a relational equation between the Tg of an acrylic polymer and the glass transition temperature Tgi of a homopolymer obtained by homopolymerizing each of monomers for forming the acrylic polymer:

$$1/Tg = \Sigma(Wi/Tgi)$$

where Tg represents the glass transition temperature (unit: K) of the acrylic polymer, Wi represents the weight fraction (copolymerization ratio on a weight basis) of a monomer "i" in the acrylic polymer, and Tgi represents the glass transition temperature (unit: K) of the homopolymer of the monomer "i".

A value described in any appropriate material may be used as the glass transition temperature of the homopolymer to be used in the calculation of the Tg. For example, for monomers listed below, the following values are used as glass transition temperatures of the homopolymers of the monomers.

| | |
|---|---|
| 2-Ethylhexyl acrylate | −70° C. |
| Methyl methacrylate | 8° C. |
| Acrylic acid | 106° C. |
| Hydroxyethyl methacrylate | 55° C. |
| Diacetone acrylamide | 77° C. |

A numerical value described in, for example, "Polymer Handbook" (3rd edition, John Wiley & Sons, Inc., 1989) may be used as the glass transition temperature of the homopolymer of the monomer except those listed above. When a plurality of kinds of values are described, the highest value is adopted.

A value obtained by a measurement method as described in Japanese Patent Application Laid-open No. 2007-51271 may be used for a monomer in which the glass transition temperature of a homopolymer thereof is not described in the above-mentioned Polymer Handbook. Specifically, 100 parts by weight of the monomer, 0.2 part by weight of azobisisobutyronitrile, and 200 parts by weight of ethyl acetate serving as a polymerization solvent are loaded into a reactor including a temperature gauge, a stirring machine, a nitrogen-introducing tube, and a reflux condenser, and are stirred for 1 hour while a nitrogen gas is flowed in the reactor. After oxygen in a polymerization system has been removed as described above, a temperature in the reactor is increased to 63° C. and the mixture is subjected to a reaction for 10 hours. Next, the resultant is cooled to room temperature to provide a homopolymer solution having a solid content concentration of 33 wt %. Next, the homopolymer solution is cast onto a release liner, and is dried to produce a test sample (sheet-shaped homopolymer) having a thickness of about 2 mm. The test sample is punched into a disc shape having a diameter of 7.9 mm. The disc is sandwiched between parallel plates, and its viscoelasticity is measured with a viscoelasticity tester (ARES, manufactured by Rheometric Scientific, Inc.) in the temperature region of from −70° C. to 150° C. at a rate of temperature increase of 5° C./min by a shear mode while a shear strain having a frequency of 1 Hz is applied to the disc. The peak top temperature of the tan δ of the disc is defined as the Tg of the homopolymer.

In at least one embodiment of the present invention, the water-dispersed acrylic polymer is preferably a polymer having a core-shell type structure (hereinafter also referred to as "core-shell polymer"). When the water-dispersed acrylic polymer is a core-shell polymer, the polymer having two or more glass transition temperatures as described above can be easily obtained. When the water-dispersed acrylic polymer is a core-shell polymer, it is preferred that a core portion have the $Tg_H$ and a shell portion have the $Tg_L$. When such water-dispersed acrylic polymer serving as a core-shell polymer is adopted, there can be provided a water-dispersed pressure-sensitive adhesive composition that has an excellent pressure-sensitive adhesive strength, and that can achieve both of adhesiveness to an adherend and light peelability. When the water-dispersed acrylic polymer is a polymer having two or more glass transition temperatures, the water-dispersed acrylic polymer serving as a core-shell polymer may have two or more shell portions. When the water-dispersed acrylic polymer has two or more shell portions, the water-dispersed acrylic polymer may have three or more glass transition temperatures. The water-dispersed acrylic polymer serving as a core-shell polymer is described in detail below as a typical example.

The water-dispersed acrylic polymer serving as a core-shell polymer is obtained by subjecting any appropriate monomer component to emulsion polymerization in a stepwise manner. The water-dispersed acrylic polymer may be obtained by, for example, subjecting a monomer composition for forming a core portion to emulsion polymerization by any appropriate method, and then subjecting a monomer composition for forming a shell portion to emulsion polymerization in the presence of the generated polymer particles serving as a core portion.

The core ratio of the water-dispersed acrylic polymer serving as a core-shell polymer is preferably 5 wt % or more, more preferably 10 wt % or more. When the weight ratio between the core portion and the shell portion falls within the above-mentioned ranges, there can be provided a water-dispersed pressure-sensitive adhesive composition that has an excellent pressure-sensitive adhesive strength, and that can achieve both of adhesiveness to an adherend and light peelability.

A-1-1. Monomer Component

The composition of the monomer composition to be used in the formation of the core portion and the shell portion may be adjusted so that a core portion or a shell portion having any appropriate glass transition temperature is formed. For example, it is only required that a monomer be selected based on Fox's equation described above so that a core portion or shell portion having a designed $Tg_H$ or $Tg_L$ is formed, and the monomer be subjected to emulsion polymerization.

Any appropriate acrylic monomer is used as a monomer component. A (meth)acrylic acid alkyl ester is used as a typical monomer component. Specific examples of the (meth)acrylic acid alkyl ester include (meth)acrylic acid C1-20 alkyl esters, such as methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, pentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, and eicoscyl (meth)acrylate. The (meth)acrylic acid alkyl esters may be used alone or in combination thereof. Herein, the term "(meth)acrylic" refers to acrylic and/or methacrylic.

The monomer composition may further contain any appropriate other monomer copolymerizable with the (meth)acrylic acid alkyl ester. Examples thereof include: carboxyl group-containing monomers, such as acrylic acid and methacrylic acid; acid anhydride monomers, such as maleic anhydride and itaconic anhydride; hydroxyl group-containing monomers including hydroxyalkyl (meth)acrylates, such as 2-hydroxyethyl (meth)acrylate, 2-hydroxypropyl (meth)acrylate, 2-hydroxybutyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxymethylcyclohexyl)methyl (meth)acrylate; sulfonic acid group-containing monomers, such as styrenesulfonic acid and allylsulfonic acid; (N-substituted) amide-based monomers, such as diacetone acrylamide, (meth)acrylamide, and N,N-dimethyl (meth)acrylamide; aminoalkyl (meth)acrylate-based monomers such as aminoethyl (meth)acrylate; alkoxyalkyl (meth)acrylate-based monomers such as methoxyethyl (meth)acrylate; maleimide-based monomers, such as N-cyclohexylmaleimide and N-isopropylmaleimide; itaconimide-based monomers, such as N-methylitaconimide and N-ethylitaconimide; succinimide-based monomers; vinyl-based monomers, such as vinyl acetate, vinyl propionate, N-vinylpyrrolidone, and methylvinylpyrrolidone; cyanoacrylate monomers, such as acrylonitrile and methacrylonitrile; epoxy group-containing acrylic monomers such as glycidyl (meth)acrylate; glycol-based acrylic ester monomers, such as polyethylene glycol (meth)acrylate and polypropylene glycol (meth)acrylate; acrylic acid ester-based monomers each having a heterocycle, a halogen atom, a silicon atom, or the like, such as tetrahydrofurfuryl (meth)acrylate, fluorine (meth)acrylate, and silicone (meth)acrylate; olefin-based monomers, such as isoprene, butadiene, and isobutylene; and vinyl ether-based monomers such as vinyl ether. The incorporation of those monomer components can modify, for example, a cohesive strength, heat resistance, or cross-linkability. Those monomer components may be used alone or in combination thereof.

A-1-2. Surfactant

Any appropriate surfactant may be used as the surfactant. Of those, a reactive surfactant may be preferably used. The reactive surfactant has a radically polymerizable functional group (e.g., a radical reactive group, such as an ethenyl group, a propenyl group, an allyl group, or an allyl ether group) in a molecule thereof while having a function as a surfactant. When the reactive surfactant is used, contamination of an adherend caused by the pressure-sensitive adhesive composition in which the water-dispersed acrylic polymer is used can be reduced, and a pressure-sensitive adhesive strength of the pressure-sensitive adhesive composition before radiation irradiation treatment can be improved. In addition, water resistance of the pressure-sensitive adhesive sheet (e.g., the pressure-sensitive adhesive layer) using the pressure-sensitive adhesive composition is also improved, and hence peeling of the pressure-sensitive adhesive sheet can be suppressed even when the sheet is brought into contact with water at the time of the processing.

The reactive surfactant is, for example, a surfactant obtained by introducing a radically polymerizable functional group (radical reactive group), such as a propenyl group or an allyl ether group, into any appropriate surfactant (e.g., an anionic surfactant or a nonionic surfactant). The reactive surfactant has a radically polymerizable functional group according to an ethylenically unsaturated double bond, and can reduce a saturated water absorption ratio of the pressure-sensitive adhesive layer to be formed as compared to a nonreactive surfactant. Further, the reactive surfactants to be preferably used may be used alone or in combination thereof from the viewpoints of stability of a water dispersion liquid and durability of the pressure-sensitive adhesive layer.

Specific examples of the anionic surfactant include: higher fatty acid salts such as sodium oleate; alkylaryl sulfonic acid salts such as sodium dodecylbenzene sulfonate; alkyl sulfuric acid ester salts, such as sodium lauryl sulfate and ammonium lauryl sulfate; polyoxyethylene alkyl ether sulfuric acid ester salts such as sodium polyoxyethylene lauryl ether sulfate; polyoxyethylene alkylaryl ether sulfuric acid ester salts such as sodium polyoxyethylene nonylphenyl ether sulfate; alkyl sulfosuccinic acid ester salts and derivatives thereof, such as sodium monooctyl sulfosuccinate, sodium dioctyl sulfosuccinate, and sodium polyoxyethylene lauryl sulfosuccinate; and polyoxyethylene distyrenated phenyl ether sulfuric acid ester salts. Specific examples of the nonionic surfactant include: polyoxyethylene alkyl ethers, such as polyoxyethylene lauryl ether and polyoxyethylene stearyl ether; polyoxyethylene alkylphenyl ethers, such as polyoxyethylene octylphenyl ether and polyoxyethylene nonylphenyl ether; sorbitan higher fatty acid esters, such as sorbitan monolaurate, sorbitan monostearate, and sorbitan trioleate; polyoxyethylene sorbitan higher fatty acid esters such as polyoxyethylene sorbitan monolaurate; polyoxyethylene higher fatty acid esters, such as polyoxyethylene monolaurate and polyoxyethylene monostearate; glycerin higher fatty acid esters, such as oleic acid monoglyceride and stearic acid monoglyceride; and a polyoxyethylene-polyoxypropylene-block copolymer and polyoxyethylene distyrenated phenyl ether.

A commercially available product may be used as the reactive surfactant. Specific examples of the anionic reactive surfactant include: alkyl ether-based reactive surfactants, such as products available under the product names "AQUALON KH-05", "AQUALON KH-10", and "AQUALON KH-20" from DKS Co. Ltd., products available under the product names "ADEKA REASOAP SR-10N" and "ADEKA REASOAP SR-20N" from Asahi Denka Co., Ltd., and a product available under the product name "LATEMUL PD-104" from Kao Corporation; sulfosuccinic acid ester-based reactive surfactants, such as products available under the product names "LATEMUL S-120", "LATEMUL S-120A", "LATEMUL S-180P", and "LATEMUL S-180A" from Kao Corporation, and a product available under the product name "ELEMINOL JS-20" from Sanyo Chemical Industries, Ltd.; alkylphenyl ether-based or alkylphenyl ester-based reactive surfactants, such as products available under the product names "AQUALON H-2855A", "AQUALON H-3855B", "AQUALON H-3855C", "AQUALON H-3856", "AQUALON HS-05", "AQUALON HS-10", "AQUALON HS-20", "AQUALON HS-30", "AQUALON BC-05", "AQUALON BC-10", and "AQUALON BC-20" from DKS Co. Ltd., and products available under the product names "ADEKA REASOAP SDX-222", "ADEKA REASOAP SDX-223", "ADEKA REASOAP SDX-232", "ADEKA REASOAP SDX-233", "ADEKA REASOAP SDX-259", "ADEKA REASOAP SE-10N", and "ADEKA REASOAP SE-20N" from Asahi Denka Co., Ltd.; (meth)acrylate sulfuric acid ester-based reactive surfactants, such as products available under the product names "ANTOX MS-60" and "ANTOX MS-2N" from Nippon Nyukazai Co., Ltd., and a product available under the product name "ELEMINOL RS-30" from Sanyo Chemical Industries, Ltd.; and phosphoric acid ester-based reactive surfactants, such as a product available under the product name "H-3330PL" from DKS Co. Ltd., and a product available under the product name "ADEKA REASOAP PP-70" from Asahi Denka Co., Ltd. Specific examples of the nonionic reactive surfactant include: alkyl ether-based reactive surfactants, such as products available under the product names "ADEKA REASOAP ER-10", "ADEKA REASOAP ER-20", "ADEKA REASOAP ER-30", and "ADEKA REASOAP ER-40" from Asahi Denka Co., Ltd., and products available under the product names "LATEMUL PD-420", "LATEMUL PD-430", and "LATEMUL PD-450" from Kao Corporation; alkylphenyl ether-based or alkylphenyl ester-based reactive surfactants, such as products available under the product names "AQUALON RN-10", "AQUALON RN-20", "AQUALON RN-30", and "AQUALON RN-50" from DKS Co. Ltd., and products available under the product names "ADEKA REASOAP NE-10", "ADEKA REASOAP NE-20", "ADEKA REASOAP NE-30", and "ADEKA REASOAP NE-40" from Asahi Denka Co., Ltd.; and (meth)acrylate sulfuric acid ester-based reactive surfactants such as products available under the product names "RMA-564", "RMA-568", and "RMA-1114" from Nippon Nyukazai Co., Ltd.

The anionic reactive surfactant is preferably used as the reactive surfactant. The anionic reactive surfactant is preferred because the surfactant is excellent in polymerization stability in many cases, and from the viewpoints of particle stability and appearance. The anionic reactive surfactant and the nonionic reactive surfactant may be used in combination.

In at least one embodiment of the present invention, the reactive surfactant preferably has a concentration of a $SO_4^{2-}$ ion of 100 μg/g or less. In addition, the reactive surfactant is preferably an ammonium salt-type surfactant. The water-dispersed pressure-sensitive adhesive composition according to at least one embodiment of the present invention is used in the pressure-sensitive adhesive sheet to be used in the processing process for the semiconductor wafer. Accordingly, an impurity ion in the water-dispersed pressure-sensitive adhesive composition may be a problem. Accordingly, the content of the impurity ion in the water-dispersed pressure-sensitive adhesive composition is preferably as low as possible. When the concentration of the $SO_4^{2-}$ ion falls within the above-mentioned ranges, and when the ammonium salt-type surfactant is used, adverse effects of the impurity ion can be suppressed. Any appropriate method, such as an ion-exchange resin method, a membrane separation method, or a method of precipitating and filtering an impurity with an alcohol, may be used as a method of reducing or removing the impurity ion.

The reactive surfactant is used in any appropriate amount. The content of the reactive surfactant is preferably from 0.1 part by weight to 5 parts by weight, more preferably from 0.5 part by weight to 3 parts by weight with respect to 100 parts by weight of the monomer composition. When the content of the reactive surfactant is more than 5 parts by weight with respect to 100 parts by weight of the monomer composition, in the case where the pressure-sensitive adhesive composition is used for a pressure-sensitive adhesive sheet for semiconductor wafer processing, a small element piece may be peeled from the pressure-sensitive adhesive sheet in a dicing step or a subsequent step. In addition, when the content of the reactive surfactant is less than 0.1 part by weight with respect to 100 parts by weight of the monomer composition, a stable emulsion state may not be maintained.

In addition, the reactive surfactant and a surfactant free of a radically polymerizable functional group may be used in combination. Examples of the surfactant free of a radically polymerizable functional group include: anionic surfactants or nonionic anionic surfactants, such as sodium lauryl sulfate, ammonium lauryl sulfate, sodium dodecylbenzene sulfonate, a sodium polyoxyethylene alkyl ether sulfate, an ammonium polyoxyethylene alkylphenyl ether sulfate, a sodium polyoxyethylene alkylphenyl ether sulfate, and a sodium polyoxyethylene alkyl sulfosuccinate; and nonionic surfactants, such as a polyoxyethylene alkyl ether, a polyoxyethylene alkylphenyl ether, a polyoxyethylene fatty acid ester, and a polyoxyethylene polyoxypropylene block polymer. Those surfactants may be used alone or in combination thereof.

A-1-3. Method of Polymerizing Water-Dispersed Acrylic Polymer

The water-dispersed acrylic polymer may be polymerized by any appropriate method. The water-dispersed acrylic polymer may be obtained by adding water such as ion-exchanged water, a monomer composition, a surfactant, a polymerization initiator, and any appropriate additive to a reaction vessel, followed by mixing, and performing emulsion polymerization. When the water-dispersed acrylic polymer is a core-shell polymer, the water-dispersed acrylic polymer serving as a core-shell polymer may be obtained as described below. For example, polymer particles serving as a core portion are formed by adding a monomer composition containing a monomer for forming a core portion, water, a surfactant, a polymerization initiator, and any appropriate additive to a reaction vessel, followed by mixing, and performing emulsion polymerization. Next, a shell portion is formed by adding a monomer composition containing a monomer for forming a shell portion, water, a surfactant, a polymerization initiator, and any appropriate additive to a reaction vessel, followed by mixing, and performing emulsion polymerization. Examples of the any appropriate additive include a chain transfer agent and a silane coupling agent.

Any appropriate polymerization initiator may be used as the polymerization initiator. Examples thereof include: azo-based polymerization initiators, such as 2,2'-azobisisobutyronitrile, 2,2'-azobis(2-amidinopropane) dihydrochloride, 2,2'-azobis[2-(5-methyl-2-imidazolin-2-yl)propane] dihydrochloride, 2,2'-azobis(2-methylpropionamidine) disulfate, and 2,2'-azobis(N,N'-dimethyleneisobutylamidine); persulfates, such as potassium persulfate and ammonium persulfate; peroxide-based polymerization initiators, such as benzoyl peroxide, t-butyl hydroperoxide, and hydrogen peroxide; and redox-based initiators each based on a combination of a peroxide and a reducing agent [e.g., redox-based polymerization initiators based on a combination of a peroxide and ascorbic acid (e.g., a combination of hydrogen peroxide water and ascorbic acid), a combination of a peroxide and an iron(II) salt (e.g., a combination of hydrogen peroxide water and an iron(II) salt), and a combination of a persulfate and sodium hydrogen sulfite]. Those polymerization initiators may be used alone or in combination thereof.

The polymerization initiator may be used in any appropriate amount in accordance with, for example, the kind of the polymerization initiator to be used and the composition of the monomer composition. For example, the content of the polymerization initiator is from 0.01 part by weight to 1 part by weight, preferably from 0.02 part by weight to 0.5 part by weight with respect to 100 parts by weight of the monomer composition.

The chain transfer agent may be used for, for example, adjusting the molecular weight of the water-dispersed acrylic polymer. Any appropriate chain transfer agent may be used as the chain transfer agent. Specific examples thereof include lauryl mercaptan, glycidyl mercaptan, mercaptoacetic acid, 2-mercaptoethanol, thioglycolic acid, 2-ethylhexyl thioglycolate, and 2,3-dimercapto-1-propanol. The chain transfer agents may be used alone or in combination thereof. The content of the chain transfer agent is typically from 0.001 part by weight to 0.5 part by weight with respect to 100 parts by weight of the monomer composition.

The water-dispersed acrylic polymer is obtained by subjecting the monomer composition, the reactive surfactant, the polymerization initiator, and any appropriate additive such as the chain transfer agent to emulsion polymerization. Accordingly, the water-dispersed acrylic polymer may be prepared in a form of an emulsion. Any appropriate method may be used as a method for the emulsion polymerization. A specific example thereof is an emulsion polymerization method utilizing a general method, such as a collective loading method (collective polymerization method), a monomer dropping method, or a monomer emulsion dropping method. When a monomer or the like is dropped, the monomer may be continuously dropped or may be dividedly dropped. A polymerization temperature may be set to any appropriate value in accordance with, for example, the kind of the polymerization initiator, and may be set to, for example, the range of from 5° C. to 100° C. In addition, an alkali aqueous solution, such as ammonia water, any of various water-soluble amines, a sodium hydroxide aqueous solution, or a potassium hydroxide aqueous solution, is preferably further added to a solution of the water-dispersed acrylic polymer obtained by the emulsion polymerization to adjust the pH to, for example, from 6 to 11, preferably from 7 to 10.

The gel fraction of the water-dispersed acrylic polymer is preferably 50 wt % or more, more preferably 70 wt % or more. When the gel fraction of the water-dispersed acrylic polymer is less than 50 wt %, a pressure-sensitive adhesive strength after radiation irradiation is hardly reduced, and contamination of an adherend by a sol content is liable to occur. The gel fraction of the water-dispersed acrylic polymer is, for example, 99 wt % or less. The gel fraction of the water-dispersed acrylic polymer may be determined by any appropriate method. For example, the gel fraction may be determined as an insoluble content with respect to a solvent such as ethyl acetate. Specifically, the gel fraction is determined as a weight fraction (unit: wt %) of an insoluble component after the water-dispersed acrylic polymer is immersed in ethyl acetate at 23° C. for 7 days with respect to a sample before immersion.

A-2. Active Energy Ray-Curable Resin

Any appropriate resin that may be cured by an active energy ray such as UV light may be used as the active energy ray-curable resin. Of those, a UV-curable resin is preferably used. For example, a UV-curable monomer and/or oligomer may be used as the UV-curable resin. Examples of the UV-curable monomer include urethane (meth)acrylate, trimethylolpropane tri(meth)acrylate, tetramethylolmethane tetra(meth)acrylate, pentaerythritol tri(meth)acrylate, pentaerythritol tetra(meth)acrylate, dipentaerythritol monohydroxy penta(meth)acrylate, dipentaerythritol hexa(meth) acrylate, and 1,4-butanediol di(meth)acrylate. Examples of the UV-curable oligomer include a urethane-based oligomer, a polyether-based oligomer, a polyester-based oligomer, a polycarbonate-based oligomer, and a polybutadiene-based oligomer. An oligomer having a molecular weight of from about 100 to about 30,000 is preferably used as the oligomer. The monomers and the oligomers may be used alone or in combination thereof. The active energy ray-curable resin may be emulsified with any appropriate surfactant or self-emulsifiable urethane (meth)acrylate as required. When the emulsification is performed, preparation of the water-dispersed pressure-sensitive adhesive composition can be easily performed.

A commercially available product may be used as the active energy ray-curable resin. Examples thereof include a product available under the product name "ETERNACOLL UW-9102" from UBE Corporation, a product available under the product name "HYDRAN Exp UV-100S" from DIC Corporation, products available under the product names "BEAMSET EM-90" and "BEAMSET EM-94" from Arakawa Chemical Industries, Ltd., products available under the product names "UCECOAT 7655", "UCECOAT 7200", and "UCECOAT 7773" from Daicel-Allnex Ltd., and products available under the product names "FOM-03006", and "FOM-03009" from FUJIFILM Wako Pure Chemical Corporation. An aqueous resin (water dispersion of a resin) may be appropriately selected and used from the viewpoint of the compatibility of the active energy ray-curable resin with the water-dispersed acrylic polymer.

The active energy ray-curable resin may be used in any appropriate amount in accordance with, for example, the kind of the water-dispersed acrylic polymer. The amount is, for example, preferably from 5 parts by weight to 200 parts by weight, more preferably from 20 parts by weight to 150 parts by weight, still more preferably from 20 parts by weight to 100 parts by weight with respect to 100 parts by weight of the water-dispersed acrylic polymer.

A-3. Photopolymerization Initiator

Any appropriate initiator may be used as the photopolymerization initiator. Examples of the photopolymerization initiator include: acyl phosphine oxide-based photopolymerization initiators, such as ethyl 2,4,6-trimethylbenzylphenyl phosphinate and (2,4,6-trimethylbenzoyl)-phenylphosphine oxide; α-ketol-based compounds, such as 4-(2-hydroxyethoxy)phenyl(2-hydroxy-2-propyl) ketone, α-hydroxy-α, α'-dimethylacetophenone, 2-methyl-2-hydroxypropiophenone, and 1-hydroxycyclohexyl phenyl ketone; acetophenone-based compounds, such as methoxyacetophenone, 2,2-dimethoxy-2-phenylacetophenone, 2,2-diethoxy-acetophenone, and 2-methyl-1-[4-(methylthio)-phenyl]-2-morpholinopropane-1; benzoin ether-based compounds, such as benzoin ethyl ether, benzoin isopropyl ether, and anisoin methyl ether; ketal-based compounds such as benzyl dimethyl ketal; aromatic sulfonyl chloride-based compounds such as 2-naphthalenesulfonyl chloride; photoactive oxime-based compounds such as 1-phenone-1,1-propanedione-2-(o-ethoxycarbonyl)oxime; benzophenone-based compounds, such as benzophenone, benzoylbenzoic acid, and 3,3'-dimethyl-4-methoxybenzophenone; thioxanthone-based compounds, such as thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, and 2,4-diisopropylthioxanthone; camphorquinone; halogenated ketones; and acyl phosphonates, and α-hydroxyacetophenones such as 2-hydroxy-1-(4-(4-(2-hydroxy-2-methylpropionyl)benzyl)phenyl)-2-methylpropane-1. The photopolymerization initiators may be used alone or in combination thereof. A photopolymerization initiator that is liquid at room temperature (e.g., 23° C.) is preferably used because the photopolymerization initiator is soluble in (compatible with) a water-dispersed acrylic polymer solution.

A commercially available product may be used as the photopolymerization initiator. Examples thereof include products available under the product names Omnirad 500, Omnirad TPO-L, Omnirad MBF, and Omnirad 1173 from IGM Resins B.V.

The photopolymerization initiator may be used in any appropriate amount. The content of the photopolymerization initiator is preferably from 0.5 part by weight to 20 parts by weight, more preferably from 1 part by weight to 10 parts by weight with respect to 100 parts by weight of the water-dispersed acrylic polymer. When the content of the photopolymerization initiator is less than 0.5 part by weight, the water-dispersed pressure-sensitive adhesive composition may not be sufficiently cured at the time of UV irradiation. When the content of the photopolymerization initiator is more than 20 parts by weight, the storage stability of the water-dispersed pressure-sensitive adhesive composition may be reduced.

A-4. Cross-Linking Agent

In at least one embodiment of the present invention, the water-dispersed pressure-sensitive adhesive composition may further include a cross-linking agent. When the cross-linking agent is used, the gel fraction of the water-dispersed pressure-sensitive adhesive composition can be adjusted. Examples of the cross-linking agent include, but not particularly limited to, bifunctional or higher epoxy-based cross-linking agents, isocyanate-based cross-linking agents, carbodiimide-based cross-linking agents, oxazoline-based cross-linking agents, aziridine-based cross-linking agents, melamine resin-based cross-linking agents, metal chelate-based cross-linking agents, peroxide-based cross-linking agents, and hydrazine-based cross-linking agents. The cross-linking agents may be used alone or in combination thereof.

Specific examples of the cross-linking agent include: epoxy-based cross-linking agents, such as N,N,N',N'-tetraglycidyl-m-xylenediamine, 1,3-bis(N,N-glycidylaminomethyl)cyclohexane, and 1,6-hexanediol diglycidyl ether; isocyanate-based cross-linking agents (e.g., blocked isocyanate-based cross-linking agents) such as tolylene diisocyanate (block); carbodiimide-based cross-linking agents such as a product available under the product name "CARBODILITE V-01" (from Nisshinbo Chemical Inc.); epoxy-based cross-linking agents, such as polyethylene glycol diglycidyl ether and polyglycerol polyglycidyl ether; water-dispersed isocyanate-based cross-linking agents such as a product available under the product name "ELASTRON BN-69" (from DKS Co. Ltd.); oxazoline-based cross-linking agents such as a product available under the product name "EPOCROS WS-500" (from Nippon Shokubai Co., Ltd.); aziridine-based cross-linking agents such as a product available under the product name "CHEMITITE PZ-33" (from Nippon Shokubai Co., Ltd.); hydrophilically treated carbodiimide-based cross-linking agents such as products available under the product names "CARBODILITE V-02" and "CARBODILITE V-04" (from Nisshinbo Chemical Inc.); cross-linking agents each having an active methylol group or an active alkoxymethyl group including an active methylol such as hexamethylolmelamine and an active alkoxymethyl such as hexamethoxymethylmelamine; metal chelate-based cross-linking agents such as a product available under the product name "ORGATIX AI135" (from Matsumoto Pharm. Ind. Co., Ltd.); and hydrazine-based cross-linking agents, such as adipic dihydrazide and phthalic dihydrazide.

The content of the cross-linking agent is, for example, from 0.01 part by weight to 10 parts by weight, preferably from 0.05 part by weight to 5 parts by weight, more preferably from 0.1 part by weight to 3 parts by weight with respect to 100 parts by weight of the water-dispersed acrylic polymer. As described above, the water-dispersed pressure-sensitive adhesive composition may be free of a cross-linking agent (that is, the content of the cross-linking agent may be 0 parts by weight).

A-5. Additive

The water-dispersed pressure-sensitive adhesive composition may include any appropriate additive as required. Examples of the additive include a catalyst (e.g., a platinum catalyst), a tackifier, a plasticizer, a pigment, a dye, a filler, an age resistor, a conductive material, a UV absorber, a light stabilizer, a peeling modifier, a softener, a flame retardant, and a solvent. The additive is used in any appropriate amount in accordance with purposes.

B. Pressure-Sensitive Adhesive Sheet for Re-Peeling

B-1. Overall Configuration of Pressure-Sensitive Adhesive Sheet for Re-Peeling

The FIGURE is a schematic sectional view of a pressure-sensitive adhesive sheet for re-peeling according to at least one embodiment of the present invention. A pressure-sensitive adhesive sheet 100 for re-peeling includes a base material 20 and a pressure-sensitive adhesive layer 10 in the stated order. The pressure-sensitive adhesive layer 10 is formed by using the above-mentioned water-dispersed pressure-sensitive adhesive composition. As described above, the water-dispersed pressure-sensitive adhesive composition described in the section A includes the photopolymerization initiator. Accordingly, excellent adhesiveness to an adherend is exhibited before UV irradiation, and an adhesive residue on the adherend or the like can be suppressed and the sheet can be easily peeled from the adherend after UV irradiation. The pressure-sensitive adhesive sheet 100 for re-peeling may further include any appropriate layer. For example, an intermediate layer (not shown) may be formed between the base material 20 and the pressure-sensitive adhesive layer 10. When the pressure-sensitive adhesive sheet 100 for re-peeling includes the intermediate layer, adhesiveness to an adherend having unevenness on its surface can be improved.

In the pressure-sensitive adhesive sheet for re-peeling, the pressure-sensitive adhesive strength to a Si wafer of the pressure-sensitive adhesive sheet for re-peeling before UV irradiation is preferably 4 N/20 mm or more, more preferably 5 N/20 mm or more, still more preferably 6 N/20 mm or more, particularly preferably 7 N/20 mm or more. When the pressure-sensitive adhesive strength to the Si wafer before UV irradiation falls within the above-mentioned ranges, the pressure-sensitive adhesive sheet has sufficient adhesiveness to an adherend. In addition, the pressure-sensitive adhesive strength to the Si wafer is, for example, 15 N/20 mm or less. Herein, the pressure-sensitive adhesive strength to the Si wafer refers to a pressure-sensitive adhesive strength measured by the following method: the pressure-sensitive adhesive sheet for re-peeling is cut out into a size of 20 mm wide by 80 mm long, and is pressure-bonded to a mirror surface of a silicon mirror wafer by reciprocating a hand roller once under an atmosphere at 23° C.; the resultant is left to stand at 23° C. for 30 minutes; and then a strength required for peeling the pressure-sensitive adhesive sheet is measured by performing a 180° peeling test under an atmosphere at 23° C. and 50% RH and under the condition of a tensile rate of 300 mm/min.

The pressure-sensitive adhesive strength to the Si wafer of the pressure-sensitive adhesive sheet for re-peeling after the pressure-sensitive adhesive sheet for re-peeling has been subjected to UV irradiation so that an integrated light quantity becomes 460 mJ/cm$^2$ is preferably less than 0.1 N/20 mm, more preferably 0.08 N/20 mm or less, still more preferably 0.06 N/20 mm or less, particularly preferably 0.05 N/20 mm or less. When the pressure-sensitive adhesive strength to the Si wafer after UV irradiation falls within the above-mentioned ranges, the pressure-sensitive adhesive sheet has light peelability. The pressure-sensitive adhesive strength after UV irradiation is preferably as small as possible. Herein, the pressure-sensitive adhesive strength to the Si wafer of the pressure-sensitive adhesive sheet for re-peeling after the pressure-sensitive adhesive sheet for re-peeling has been subjected to UV irradiation so that an integrated light quantity becomes 460 mJ/cm$^2$ refers to a value measured by the following method: the pressure-sensitive adhesive sheet for re-peeling is cut out into a size of 20 mm wide by 80 mm long, and is pressure-bonded to a mirror surface of a silicon mirror wafer by reciprocating a hand roller once under an atmosphere at 23° C.; the resultant is left to stand at 23° C. for 30 minutes; then the pressure-sensitive adhesive sheet is irradiated with UV light (UV) from a pressure-sensitive adhesive sheet surface side so that the integrated light quantity becomes 460 mJ/cm$^2$ (365 nm conversion); and then a strength required for peeling the pressure-sensitive adhesive sheet is measured by performing a 180° peeling test under an atmosphere at 23° C. and 50% RH and under the condition of a tensile rate of 300 mm/min.

The thickness of the pressure-sensitive adhesive sheet for re-peeling according to at least one embodiment of the present invention may be set to any appropriate thickness. The thickness of the pressure-sensitive adhesive sheet for re-peeling is preferably from 30 μm to 400 μm, more preferably from 40 μm to 300 μm, still more preferably from 50 μm to 200 μm.

B-2. Base Material

The base material may be formed of any appropriate resin. Specific examples of the resin for forming the base material include polyester-based resins, such as polyethylene naphthalate (PEN), polybutylene terephthalate (PBT), and polybutylene naphthalate (PBN), an ethylene-vinyl acetate copolymer, an ethylene-methyl methacrylate copolymer, polyolefin-based resins, such as polyethylene, polypropylene, and an ethylene-propylene copolymer, polyvinyl alcohol, polyvinylidene chloride, polyvinyl chloride, a vinyl chloride-vinyl acetate copolymer, polyvinyl acetate, polyamide, polyimide, celluloses, a fluorine-based resin, polyether, polystyrene-based resins such as polystyrene, polycarbonate, polyether sulfone, and polyether ether ketone. Of those, polyolefin-based resins or polyester-based resins are preferred. Those resins each transmit UV light, and hence can each form the pressure-sensitive adhesive layer with a UV-curable pressure-sensitive adhesive to provide a pressure-sensitive adhesive sheet for re-peeling having light peelability.

The base material may further contain another component to the extent that the effects of the present invention are not impaired. Examples of the other component include an antioxidant, a UV absorber, a light stabilizer, a heat stabilizer, and an antistatic agent. With regard to the kind and usage amount of the other component, the other component may be used in any appropriate amount in accordance with purposes.

The thickness of the base material is preferably from 30 μm to 200 μm, more preferably from 40 μm to 180 μm, still more preferably from 45 μm to 180 μm.

B-3. Pressure-Sensitive Adhesive Layer

The pressure-sensitive adhesive layer is formed by using the water-dispersed pressure-sensitive adhesive composition described in the section A. As described above, the water-dispersed pressure-sensitive adhesive composition described in the section A has an excellent pressure-sensitive adhesive strength, and can achieve both of adhesiveness to an adherend and light peelability.

The thickness of the pressure-sensitive adhesive layer may be set to any appropriate value. The thickness of the pressure-sensitive adhesive layer is preferably from 2 μm to 200 μm, more preferably from 3 μm to 150 μm, still more preferably from 5 μm to 100 μm. When the thickness of the pressure-sensitive adhesive layer falls within the above-mentioned ranges, a sufficient pressure-sensitive adhesive strength to an adherend can be exhibited.

C. Production Method for Pressure-Sensitive Adhesive Sheet for Re-Peeling

The pressure-sensitive adhesive sheet for re-peeling according to at least one embodiment of the present invention may be produced by any appropriate method. The pressure-sensitive adhesive sheet for re-peeling may be obtained by, for example, applying a water-dispersed pressure-sensitive adhesive composition to a release liner, drying the composition to form a pressure-sensitive adhesive layer on the release liner, and then transferring the pressure-sensitive adhesive layer to the base material. In addition, the pressure-sensitive adhesive sheet for re-peeling may be obtained by applying the water-dispersed pressure-sensitive adhesive composition onto the base material and drying the composition. Various methods, such as bar coating, air knife coating, gravure coating, gravure reverse coating, reverse roll coating, lip coating, die coating, dip coating, offset printing, flexographic printing, and screen printing, may each be adopted as a method of applying the water-dispersed pressure-sensitive adhesive composition. Any appropriate method may be adopted as a method for the drying.

D. Usage of Pressure-Sensitive Adhesive Sheet for Re-Peeling

The pressure-sensitive adhesive sheet for re-peeling according to at least one embodiment of the present invention can be suitably used in a production process for a semiconductor wafer. The pressure-sensitive adhesive sheet for re-peeling can be used as, for example, a dicing tape or a backgrinding tape. As described above, the pressure-sensitive adhesive sheet for re-peeling according to at least one embodiment of the present invention is excellent in appearance of the pressure-sensitive adhesive layer. Accordingly, even when the pressure-sensitive adhesive sheet for re-peeling is used in the processing process for the semiconductor wafer involving jetting water for cooling or removal of foreign matter, the adherend is appropriately held and occurrence of, for example, wafer chipping and chip fly can be suppressed.

EXAMPLES

The present invention is specifically described below by way of Examples, but the present invention is not limited to these Examples. In addition, "part (s)" and "%" in Examples are by weight unless otherwise stated.

[Synthesis Example 1] Synthesis of Acrylic
Polymer A

180 Parts by weight of water, 32 parts by weight of 2-ethylhexyl acrylate (2EHA), 60 parts by weight of methyl methacrylate (MMA), 4 parts by weight of acrylic acid (AA), 3 parts by weight of hydroxyethyl methacrylate (HEMA), 1 part by weight of diacetone acrylamide (DAAM), and 1.5 parts by weight of a reactive surfactant (manufactured by DKS Co. Ltd., product name: "AQUALON KH-1025") were mixed in a reaction vessel including a condenser, a nitrogen-introducing tube, a temperature gauge, and a stirring device, and the mixture was stirred and emulsified with a homomixer. After that, while the resultant was stirred, the reaction vessel was purged with nitrogen for 1 hour. Subsequently, an inner bath temperature during the polymerization was controlled to 30° C. Next, 0.1 part by weight of hydrogen peroxide water (content: 30 wt %) was added to the resultant, and then 1 ml of an ascorbic acid aqueous solution (aqueous solution obtained by mixing 0.05 part by weight of ascorbic acid and 10 parts by weight of water) was added thereto to initiate the polymerization. The polymerization reaction was performed for 2 hours. Thus, a water dispersion liquid having dispersed therein core particles was obtained.

Next, 180 parts by weight of water, 51 parts by weight of 2EHA, 41 parts by weight of MMA, 4 parts by weight of AA, 3 parts by weight of HEMA, 1 part by weight of DAAM, and 0.5 part by weight of a reactive surfactant (manufactured by DKS Co. Ltd., product name: "AQUALON KH-1025") were mixed, and the mixture was stirred and emulsified with a homomixer to provide a monomer emulsion solution. After that, the monomer emulsion solution was added to the water dispersion liquid having dispersed therein the core particles. While the resultant was stirred, the reaction vessel was purged with nitrogen for 1 hour. Next, 1 ml of the ascorbic acid aqueous solution was added thereto to initiate the polymerization. 2 Hours after the initiation of the polymerization, the remaining 8 ml of the ascorbic acid aqueous solution was added thereto to further perform an aging reaction for 3 hours. Thus, a core-shell type water-dispersed acrylic polymer A was obtained.

[Synthesis Examples 2 to 5] Synthesis of Acrylic
Polymers B to E

Core-shell type water-dispersed acrylic polymers B to E were each obtained in the same manner as in Synthesis Example 1 except that the monomer compositions of the core portion and the shell portion were changed as shown in Table 1.

[Synthesis Example 6] Synthesis of Acrylic
Polymer F

180 Parts by weight of water, 62 parts by weight of 2EHA, 30 parts by weight of MMA, 4 parts by weight of AA, 3 parts by weight of HEMA, 1 part by weight of DAAM, and 2 parts by weight of a reactive surfactant (manufactured by DKS Co. Ltd., product name: "AQUALON KH-1025") were added to a reaction vessel including a condenser, a nitrogen-introducing tube, a temperature gauge, and a stirring device, and the mixture was stirred and emulsified with a homomixer. Next, while the resultant was stirred, the reaction vessel was purged with nitrogen for 1 hour. Subsequently, an inner bath temperature during the polymerization was controlled to 30° C. Next, 0.1 part by weight of hydrogen peroxide water (content: 30 wt %) was added to the resultant, and then 1 ml of an ascorbic acid aqueous solution (aqueous solution containing 0.05 part by weight of ascorbic acid and 10 parts by weight of water) was added thereto to initiate the polymerization. 2 Hours after the initiation of the polymerization, the remaining 9 ml of the ascorbic acid aqueous solution was added thereto to further perform an aging reaction for 3 hours. Thus, a water-dispersed acrylic polymer F was synthesized.

TABLE 1

|  | | A | B | C | D | E | F |
|---|---|---|---|---|---|---|---|
| Core | 2EHA | 32 | 32 | 33 | 72 | 72 | 52 |
|  | MMA | 60 | 60 | 60 | 21 | 21 | 40 |
|  | AA | 4 | 4 | 4 | 4 | 4 | 4 |
|  | HEMA | 3 | 3 | 3 | 3 | 3 | 3 |
|  | DAAM | 1 | 1 | 0 | 0 | 0 | 1 |
|  | KH-1025 | 3 | 3 | 3 | 3 | 7.5 | 2 |
| Shell | 2EHA | 51 | 67 | 68 | 33 | 33 | — |
|  | MMA | 41 | 25 | 25 | 60 | 60 | — |
|  | AA | 4 | 4 | 4 | 4 | 4 | — |
|  | HEMA | 3 | 3 | 3 | 3 | 3 | — |
|  | DAAM | 1 | 1 | 0 | 0 | 0 | — |
|  | KH-1025 | 1 | 1 | 1 | 1 | 0.625 | — |
|  | Core/shell | 50/50 | 50/50 | 50/50 | 50/50 | 20/80 | 100/0 |

2EHA: 2-ethylhexyl acrylate
MMA: methyl methacrylate
AA: acrylic acid
HEMA: hydroxyethyl methacrylate
DAAM: diacetone acrylamide
KH-1025: manufactured by DKS Co. Ltd., product name: "AQUALON KH-1025"

Example 1

100 Parts by weight (solid content) of a core-shell type water-dispersed acrylic polymer A, 50 parts by weight of a UV-curable resin (manufactured by UBE Corporation, product name: "ETERNACOLL UW-9102"), 0.5 part by weight of a cross-linking agent (manufactured by Otsuka Chemical Co., Ltd., product name: "Adipic hydrazide"), and 3 parts by weight of a photopolymerization initiator (manufactured by IGM Resins B.V., product name: "Omnirad 500", a mixture of 1-hydroxycyclohexyl phenyl ketone (50%) and benzophenone (50%)) were added and mixed. Next, the mixture was neutralized with 10% ammonia water. Thus, a water-dispersed pressure-sensitive adhesive solution was obtained.

The resultant pressure-sensitive adhesive solution was applied onto a silicone release treatment surface of a polyester film (thickness: 50 μm) subjected to silicone release treatment so that its thickness after drying became 20 μm. The resultant was dried at 125° C. for 3 minutes to form a pressure-sensitive adhesive layer. Next, a polyolefin (PO) film (thickness: 80 μm) subjected to surface oxidation treatment by corona discharge was bonded to a pressure-sensitive adhesive layer-side surface of the pressure-sensitive adhesive layer so that the pressure-sensitive adhesive layer was transferred. Thus, a pressure-sensitive adhesive sheet was produced.

Example 2

A pressure-sensitive adhesive sheet was obtained in the same manner as in Example 1 except that the core-shell type water-dispersed acrylic polymer B was used in place of the core-shell type water-dispersed acrylic polymer A.

Example 3

A pressure-sensitive adhesive sheet was obtained in the same manner as in Example 1 except that: the core-shell type water-dispersed acrylic polymer C was used in place of the core-shell type water-dispersed acrylic polymer A; and V-04 (manufactured by Nisshinbo Chemical Inc., product name: "CARBODILITE V-04") was used as the cross-linking agent in place of ADH.

Example 4

A pressure-sensitive adhesive sheet was obtained in the same manner as in Example 3 except that EM-94 (manufactured by Arakawa Chemical Industries, Ltd., product name: "BEAMSET EM-94") was used as the UV-curable resin in place of UW-9102.

Example 5

A pressure-sensitive adhesive sheet was obtained in the same manner as in Example 3 except that UV-100S (manufactured by DIC Corporation, product name: "HYDRAN Exp UV-100S") was used as the UV-curable resin in place of UW-9102.

Example 6

A pressure-sensitive adhesive sheet was obtained in the same manner as in Example 1 except that the core-shell type water-dispersed acrylic polymer D was used in place of the core-shell type water-dispersed acrylic polymer A.

Example 7

A pressure-sensitive adhesive sheet was obtained in the same manner as in Example 1 except that the core-shell type water-dispersed acrylic polymer E was used in place of the core-shell type water-dispersed acrylic polymer A.

Example 8

A pressure-sensitive adhesive sheet was obtained in the same manner as in Example 7 except that: the content of the UV-curable resin was changed to 100 parts by weight; and the cross-linking agent was not added.

Example 9

A pressure-sensitive adhesive sheet was obtained in the same manner as in Example 7 except that the content of the UV-curable resin was changed to 100 parts by weight.

Comparative Example 1

A pressure-sensitive adhesive sheet was obtained in the same manner as in Example 1 except that the water-dispersed acrylic polymer F was used in place of the core-shell type water-dispersed acrylic polymer A.

Comparative Example 2

A pressure-sensitive adhesive sheet was obtained in the same manner as in Example 1 except that: the water-dispersed acrylic polymer F was used in place of the core-shell type water-dispersed acrylic polymer C; and UV-100S (manufactured by DIC Corporation, product name: "HYDRAN Exp UV-100S") was used as the UV-curable resin in place of UW-9102.

<Evaluation>

The following evaluations were performed by using the water-dispersed acrylic polymers used in Examples and Comparative Examples and the pressure-sensitive adhesive sheets obtained in Examples and Comparative Examples. The results are shown in Table 2.

1. Glass Transition Temperature

The glass transition temperatures of the water-dispersed acrylic polymers obtained in Synthesis Examples 1 to 6 were measured with a dynamic viscoelasticity-measuring apparatus (manufactured by TA Instruments, product name: "ARES"). The Tgs of the core and the shell were determined from the resultant values of Tan δ.

2. Pressure-Sensitive Adhesive Strength

The resultant pressure-sensitive adhesive sheet was cut out into a size of 20 mm wide by 80 mm long, and was pressure-bonded to a mirror surface of a silicon mirror wafer (manufactured by Shin-Etsu Handotai Co., Ltd.) by reciprocating a hand roller once under an atmosphere at 23° C. The resultant was left to stand at 23° C. for 30 minutes. After that, a strength required for peeling the pressure-sensitive adhesive sheet was measured under an atmosphere at 23° C. and 50% RH and under the conditions of 180° peeling and a tensile rate of 300 mm/min. The strength was defined as a pressure-sensitive adhesive strength before UV.

In addition, the pressure-sensitive adhesive sheet was pressure-bonded to the silicon mirror wafer by the same method as that described above, and the resultant was left to stand at 23° C. for 30 minutes. Next, the pressure-sensitive adhesive sheet was irradiated with UV light (UV) (integrated light quantity: 460 mJ/cm$^2$ (365 nm conversion)) from a pressure-sensitive adhesive sheet surface side. After that, a strength required for peeling the pressure-sensitive adhesive sheet was measured under an atmosphere at 23° C. and 50% RH and under the conditions of 180° peeling and a tensile rate of 300 mm/min. The strength was defined as a pressure-sensitive adhesive strength after UV.

20

UW-9102: manufactured by UBE Corporation, product name: "ETERNACOLL UW-9102"

EM-94: manufactured by Arakawa Chemical Industries, Ltd., product name: "BEAMSET EM-94"

UV-100S: manufactured by DIC Corporation, product name: "HYDRAN Exp UV-100S"

ADH: manufactured by Otsuka Chemical Co., Ltd., product name: "Adipic hydrazide"

V-04: manufactured by Nisshinbo Chemical Inc., product name: "CARBODILITE V-04"

Omnirad 500: manufactured by IGM Resins B.V., product name: "Omnirad 500"

The pressure-sensitive adhesive sheets of Examples of the present invention each had a high pressure-sensitive adhesive strength before UV irradiation and a sufficiently reduced pressure-sensitive adhesive strength after UV irradiation. Thus, the pressure-sensitive adhesive sheets were each able to achieve both of adhesiveness to an adherend and light peelability.

The water-dispersed pressure-sensitive adhesive composition according to at least one embodiment of the present invention can be suitably used for forming a pressure-sensitive adhesive layer of a pressure-sensitive adhesive sheet for re-peeling.

According to at least one embodiment of the present invention, there can be provided the water-dispersed pressure-sensitive adhesive composition that has an excellent pressure-sensitive adhesive strength, and that can achieve both of adhesiveness to an adherend and light peelability, and the pressure-sensitive adhesive sheet for re-peeling using the water-dispersed pressure-sensitive adhesive composition.

What is claimed is:

1. A water-dispersed pressure-sensitive adhesive composition, comprising:

a water-dispersed acrylic polymer;

an active energy ray-curable resin; and a photopolymerization initiator, wherein the water-dispersed acrylic polymer is a polymer having two or more glass transition temperatures; and wherein the water-dispersed acrylic polymer is a polymer having a core-shell structure.

TABLE 2

| | | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|---|
| Acrylic polymer | A | 100 | — | — | — | — | — | — | — | — | — | — |
| | B | — | 100 | — | — | — | — | — | — | — | — | — |
| | C | — | — | 100 | 100 | 100 | — | — | — | — | — | — |
| | D | — | — | — | — | — | 100 | — | — | — | — | — |
| | E | | | | | | — | 100 | 100 | 100 | — | — |
| | F | | | | | | — | — | — | — | 100 | 100 |
| UV-curable resin | UW-9102 | 50 | 50 | 50 | — | — | 50 | 50 | 100 | 100 | 50 | — |
| | EM-94 | — | — | — | 50 | — | — | — | — | — | — | — |
| | UV-100S | — | — | — | — | 50 | — | — | — | — | — | 50 |
| Cross-linking agent | ADH | 0.5 | 0.5 | — | — | — | — | — | — | — | — | — |
| | V-04 | — | — | 0.5 | 0.5 | 0.5 | 0.5 | 0.5 | — | 0.5 | 0.5 | 0.5 |
| Photopolymerization initiator | Omnirad 500 | 3 | 3 | 3 | 3 | 3 | 3 | 3 | 3 | 3 | 3 | 3 |
| Tg [° C.] | Core | 22 | 22 | 22 | 22 | 22 | -40 | -40 | -40 | -40 | -30 | -30 |
| | Shell | -12 | -35 | -35 | -35 | -35 | 20 | 20 | 20 | 20 | — | — |
| 180° pressure-sensitive adhesive strength [N/20 mm] | Before UV | 8.8 | 8.4 | 11.0 | 11.8 | 6.8 | 6.8 | 5.5 | 8.3 | 7.8 | 7.3 | 2.8 |
| | After UV | 0.05 | 0.05 | 0.04 | 0.03 | 0.03 | 0.10 | 0.08 | 0.05 | 0.05 | 0.60 | 0.28 |

2. The water-dispersed pressure-sensitive adhesive composition according to claim 1, wherein the water-dispersed acrylic polymer has a glass transition temperature $Tg_H$ that is 0° C. or more and a glass transition temperature $Tg_L$ that is less than 0° C.

3. The water-dispersed pressure-sensitive adhesive composition according to claim 1, further comprising a cross-linking agent.

4. A water-dispersed pressure-sensitive adhesive composition, comprising:

a water-dispersed acrylic polymer;

an active energy ray-curable resin; and a photopolymerization initiator, wherein the water-dispersed acrylic polymer is a polymer having a core-shell structure.

5. A pressure-sensitive adhesive sheet for re-peeling, comprising:

a pressure-sensitive adhesive layer; and a base material, wherein the pressure-sensitive adhesive layer is a layer formed by using the water-dispersed pressure-sensitive adhesive composition of claim 1.

6. The pressure-sensitive adhesive sheet for re-peeling according to claim 5, wherein the pressure-sensitive adhesive sheet for re-peeling has a 180° pressure-sensitive adhesive strength to a Si wafer after UV irradiation at an integrated light quantity of 460 mJ/cm² of less than 0.1 N/20 mm.

7. The pressure-sensitive adhesive sheet for re-peeling according to claim 5, wherein the pressure-sensitive adhesive sheet for re-peeling has a 180° pressure-sensitive adhesive strength to a Si wafer of 4 N/20 mm or more.

8. The pressure-sensitive adhesive sheet for re-peeling according to claim 5, wherein the pressure-sensitive adhesive sheet for re-peeling is used for semiconductor wafer processing.

\* \* \* \* \*